United States Patent Office 3,012,973
Patented Dec. 12, 1961

3,012,973
CONCENTRATED SILICA AQUASOLS OF LOW VISCOSITY AND THEIR PREPARATION
Robert C. Atkins, Munster, Ind., assignor to E. I. du Pont de Nemours and Company, Wilmington, Del., a corporation of Delaware
No Drawing. Filed Mar. 18, 1959, Ser. No. 800,073
6 Claims. (Cl. 252—313)

This invention relates to novel alkali-stablized silica sols which have relatively low viscosity in spite of being concentrated and containing particles of high surface area, and to processes for producing such sols. More particularly, the invention is directed to aquasols of amorphous silica particles having a surface area, A, of from 60 to 300 square meters per gram, said sols being stabilized by containing an amount of alkali sufficient to give the sol an $SiO_2:M_2O$ mol ratio, R, of from 10,000/A:1 to 120,000/A:1 where M is a monovalent cation, preferably selected from the group consisting of alkali metal, ammonium, and short-chain, hydrocarbon-substituted ammonium ions, the concentration of silica in the sol being from above $$35 \text{ to } \frac{110}{(1+.000667A)^3+0.6} \text{ percent}$$

and the sol containing from $(0.0015+0.0065(x-y))$ to 0.05 equivalents of a soluble salt per liter of solvent, the salt having a cation of the group M, where $x^{1001}=R-129$ and $y^{1001}=R-501$. The invention is further directed to processes for producing such sols comprising the steps of preparing an aquasol of amorphous silica particles having a surface area, A, of from 60 to 300 square meters per gram, said sol having an $SiO_2:M_2O$ mol ratio, R, of from 10,000/A:1 to 120,000/A:1 where M is as above indicated, and having a relative viscosity, as measured at 10% $SiO_2$ and pH 2, of from 1.13 to 1.45, the sol containing less than 35% $SiO_2$ by weight and an amount of soluble salt of cation M equal to from $$\frac{a}{b}(0.0015+0.0065(x-y)) \text{ to } \frac{a}{b}(0.05)-C$$

where $a$ is the concentration of silica in the sol, $b$ is the concentration of silica desired in the final product and C is calculated from the expression:

$$\log C = 12.1 - 3.4 \log AR$$

and evaporating water from said sol while supplying heat thereto until the per cent $SiO_2$ concentration by weight is from $$35 \text{ to } \frac{110}{(1+.000667A)^3+0.6}$$

Aquasols of amorphous silica particles have been commercially available for some time at concentrations up to about 30% $SiO_2$. The desirability of even higher concentrations has been recognized, but no product more concentrated than about 30% $SiO_2$ has hitherto been commercially available.

When one attempts to increase the concentration of 30% silica aquasols above about 35% difficulties are immediately encountered due to gelling of the sol or to sharply increased relative viscosity. This is especially true when the amorphous silica particles have a high specific surface area, either because of consisting of extremely small particles or because the particles are agglomerated. When the surface area is above about 60 square meters per gram and an attempt is made to concentrate the sol above 25% the sol thickens to such an extent that it is difficult to use in applications where fluidity is essential.

It has hitherto been suggested that the way to obtain satisfactory, high-concentration silica sols is by making the sols substantially free of electrolyte. Thus, in U.S. Patents 2,577,484 and 2,577,485 issued December 4, 1951, to J. M. Rule methods are described for making such electrolyte-free sols.

The present invention is not concerned with such electrolyte-free sols, since such sols, at maximum concentration, are quite viscous, especially when they contain particles of very small size or have a correspondingly high specific surface area.

Now according to the present invention it has been found that salts do not always have the deleterious effects in silica sols previously attributed to them, but on the contrary, within carefully controlled limits and under particular conditions, can be included to advantage in sols more concentrated than 35% $SiO_2$. More particularly, it has been found that by including controlled quantities of salts in alkali-stabilized silica aquasols of specified ratio, particle surface area, and concentration, sols having relative viscosities lower than those of corresponding salt-free sols at the same concentration, are obtained. The salts can be incorporated at any time during the preparation of the sol and hence can, if desired, be included with the original starting materials from which the sol is made. The precise limits of the conditions necessary to be controlled to obtain the novel results of this invention will be apparent from the following detailed description.

THE SILICA SOL PRODUCTS

The silica sol porducts with which this invention is concerned are aquasols—that is, the continuous phase is substantially water. It will be understood that minor amounts of nonauqeous liquids, such as ethanol or acetone, can be included provided such amounts are not large enough to increase the proportion of silica to water outside the concentration limits hereinafter disclosed.

The discontinuous phase of the sols comprises amorphous silica particles although it will again be understood that minor amounts of other inorganic colloidal particles such as aluminosilicates can be present provided they are compatible with the silica particles, this usually being the case when the charge on the other particles is the same as the charge on the silica particles. By amorphous is meant that the particles do not show on an X-ray diffraction pattern the Laue lines characteristic of crystallinity. Thus, some kind of orientation of the silica is possible provided it does not attain the regularity of crystallinity.

It is important to control the surface area of the silica particles in the sol within definite and rather narrow limits, viz., from 60 to 300 square meters per gram (hereinafter abbreviated m.²/g.). The surface area of any sol particles is hereinafter designated "A." It can be readily determined by techniques with which the art is already familiar, such as by nitrogen adsorption.

It will be noted that there is a correlation between the surface and the size of the silica particles in the sol, the surface area of discrete particles varying inversely with the average diameter. For sols containing particles which are perfect spheres and are completely discrete, a surface area of 300 m.²/g. would indicate particles about 9 millimicrons in diameter; however, the particles are never perfect spheres and never entirely discrete, so that for practical purposes it is found that sol particles having a surface area of 300 m.²/g. will always have a minimum average diameter above 10 millimicrons. Particles of lower surface area will, of course, range upwardly in size from this minimum.

The silica sols are alkali stabilized. This means that there is present a small but definite amount of a compatible alkali so that for any given sol there is a definite silica:alkali mol ratio, hereinafter designated as $SiO_2:M_2O$.

In the discussion of ratios which follows, the "M" of $M_2O$ stands for a monovalent cation preferably selected from the group consisting of alkali metals, ammonium, and short-chain, hydrocarbon-substituted ammonium. The latter two cannot, of course, exist as the oxides, but the corresponding hydroxides can be calculated as the oxides. By "short-chain" is meant that the hydrocarbon-substituted groups contain from 1 to 4 carbon atoms. Thus, the alkali of the ratio can be, for instance, sodium hydroxide, potassium hydroxide, ammonium hydroxide, tetramethylammonium hydroxide, or tetraethylammonium hydroxide. Other bases which can be used include guanidine and other nitrogen bases, and sulfonium and phosphonium bases, provided any hydrocarbon substituent groups thereon are short chain. Long-chain hydrocarbon substituent groups make the bases surface active, and are to be avoided.

Silica and alkali components making up the ratio can be determined by ordinary analytical methods with which the art is already familiar. When alkalinity is determined by titration care must be taken, of course, to titrate all of the alkalinity. If the end-point of the titration is not permanent, the titration will either be continued until permanency is attained, or an amount of acid will be added in excess of that required to neutralize all of the alkalinity and the excess will be back-titrated with standard alkali.

The $SiO_2:M_2O$ mol ratio, hereinafter designated "R," must be in the range of from $10,000/A:1$ to $120,000/A:1$. Since as already noted A can vary from 60 to 300, the ratio will necessarily be in the range from 33 to 2,000. For any particular sol this range, of course, will be much narrower because the value of A will become fixed.

The maximum concentration of the sol is also dependent upon the specific surface area. Thus, the concentration of the silica in the sol can be from above 35% to the percentage determined from the expression $$\frac{110}{(1+.000667)^3+0.6}$$

Again substituting the maximum and minimum values for A in this expression it will be seen that the maximum silica concentration can be about 64% when the surface area is 60 m.²/g. but only about 47% when the surface area is 300 m.²/g.

The maximum concentrations above indicated can be achieved when the surface areas of the silica sol particles represent the surface of substantially discrete, smooth spheres. The relative viscosity of silica sols is inversely proportional to the percent of silica particles present as such discrete spheres. Thus, to reach the maximum concentrations sols of minimum relative viscosities will be used. This is especially important when sols containing over 50% of silica are to be produced. The relative viscosities of sols prepared as above described and as disclosed in the examples will ordinarily be satisfactory for use in preparing sol products having maximum silica concentrations.

THE SALT CONTENT OF THE SOLS

The salt which is included in a sol of this invention is a soluble salt of a monovalent cation of the group M, where M has the meaning already defined above with regard to ratio. Thus, it can be an alkali metal salt, an ammonium salt, or a hydrocarbon-substituted ammonium salt. Of the alkali-metal salts lithium, sodium, and potassium salts are preferred. The anion of the salt is of relatively minor consequence except that fluorides have a tendency to gel the silica sol and hence are usually avoided. Chlorides, sulfates, acetates, nitrates and sulfamates are among the preferred salts.

The salt content desired in the sol is a function of the ratio, R, and is from $(0.0015+0.0065(x-y))$ to $0.05$ equivalents per liter of solvent, where $x^{1001}=R-129$ and $y^{1001}=R-501$.

The viscosity of a sol product of this invention is related to its concentration, but by reason of control of the salt content as above described, the viscosity at any given concentration is lower than it would be if the salt were not present. On the other hand, of course, if the salt content exceeds substantially the value above indicated, it will cause the sol to be less stable and ultimately to gel.

The viscosity can be determined by methods with which the art is already familiar and which are known to be suitable for sols of this type, such as the Ostwald pipette method by measuring the drain time and comparing with water. The extent to which the presence of salt in the concentration range as taught by this invention lowers the viscosity of the sol can be determined by comparing the viscosity in the presence and absence of the salt. The presence of the salt increases the fluidity of the sol and thereby provides the basis by which more concentrated sols of lower viscosity can be prepared.

The electrolyte content of the novel sols can be measured by methods with which the art is already familiar. For instance, it can be measured by conductivity.

The salt content in silica sols can be determined from the conductivity of such sols after adjusting the pH to 4.0, and expressed as sodium sulfate, $Na_2SO_4$. This adjustment is made by deionizing with well-washed Nalcite HCR cation-exchange resin in the hydrogen form.

For the purpose of measuring conductivity, a Leeds and Northrup conductivity dip cell (Catalog 4920, cell constant=0.1) in connection with a conductivity bridge Model RC1, Industrial Instruments, Inc., or equivalent, is used.

The conductivity method is as follows:
(1) Dilute the sample to 4% $SiO_2$ and adjust the pH to 4.0, and temperature to 25° C.
(2) Measure conductivity and calculate the specific conductance of the solution, L, from the resistance reading and the cell constant: $L=K/R$.
(3) Obtain the specific conductance due to the salt, $L_s$, from the equation:

$$L_s=L-0.000043$$

(4) Calculate the salt content, $C_s$, as follows:

$$C_s=\frac{1000\times L_s}{124}$$

PROCESS FOR MAKING THE SOL

The novel salt-containing sols above described can be made by any process which will bring the critical conditions within ranges stated. Thus, for instance, the required quantity of salt can merely be stirred into a body of silica sol which otherwise conforms to the stated specifications. However, this creates higher-than-desired salt concentrations in the vicinity of the dissolving salt, tending to make the sol unstable. On the other hand, if the salt is added in the form of a dilute aqueous solution to the concentrated sol, an undesirable dilution of the sol is effected.

Now in accordance with a further aspect of this invention it has been found that the novel silica sols already described can advantageously be prepared by processes comprising the steps of preparing an aquasol of amorphous silica particles having a surface area of from 60 to 300 m.²/g., said sol having an $SiO_2:M_2O$ mol ratio of from $10,000/A:1$ to $120,000/A:1$ and having a relative viscosity, using water as the reference, as measured at 10% $SiO_2$ and pH 2, of from 1.13 to 1.45, the sol containing less than 35% $SiO_2$ by weight and an amount of soluble salt of cation of group M equal to from $$\frac{a}{b}(0.0015+0.0065(x-y)) \text{ to } \frac{a}{b}(0.05)-C$$

where $a$ is the concentration of the silica in the sol, $b$ is the concentration of silica desired in the final product and C is calculated from the expression:

$$\log C = 12.1 - 3.4 \log AR$$

and evaporating water from said sol while supplying heat thereto until the percent $SiO_2$ concentration by weight is from above $$35 \text{ to } \frac{110}{(1+.000667A)^3 + 0.6}$$

In less quantitative terms, the preferred processes comprise preparing the relatively dilute starting sol containing such an amount of salt that when the sol is concentrated to the desired silica content, the salt content will also be in the desired range. The starting sol, of course, must not only contain the right amount of salt but must also have the correct $SiO_2:M_2O$ mol ratio and relative viscosity and must contain particles of the correct specific surface area.

Processes for producing silica sols containing particles of such a size that the surface area is within the desired range have recently come to be well known in the art. The older practices of neutralizing sodium silicate solutions with acid do not give a suitable sol because the surface area of the particles contained therein is much too high and also the salt content is far too great. However, such sols can be dialyzed to remove salt and the size of the particles can be built up with a corresponding reduction in surface area by a build-up process such as is taught in U.S. Patent 2,574,902 to Bechtold and Snyder. It is preferable, however, to employ the ion-exchange processes as taught in the Bechtold and Snyder patent for making the silica sol feed and heel.

Other methods for making silica sols of the desired surface area are described in Broge et al. U.S. Patent 2,680,721 and Trail U.S. Patent 2,573,743.

In one preferred method for making the starting sol, a salt-free, aqueous silica sol having a pH of from 3 to less than 7 and containing particles having a surface area of from 200 to 400 m.$^2$/g. and a total $M_2O:SiO_2$ ratio of 0.0001:1 to 0.002:1 and containing 2 to 20% silica is heated in a closed container to a temperature of from 160 to 370° C. to grow the particles and thereby reduce the surface area.

If the sol so prepared does not have the desired ratio in relation to surface area, the ratio can be adjusted by adding an alkaline material such as sodium hydroxide or sodium silicate if the ratio is too high, or taking out alkali by such methods as ion exchange as described, for instance, in Rule U.S. Patents 2,577,484 and 2,577,485, if the ratio is too low. The ratio can also be adjusted by neutralizing some of the alkali with an acid, but in this event care must be taken that the metathetically formed salt is taken into account later when calculating the total salt content.

The relative viscosity of the starting sol is, of course, important. When the sol is prepared by methods as described above it is usually found that the relative viscosity is within the desired range. In polymerizing the silica, care is exercised to prevent aggregation of the ultimate particles into clusters, since otherwise the relative viscosity will not be within the desired range, which is, as indicated above, from 1.13 to 1.45 when measured at pH 2 and 10% $SiO_2$. Optimum conditions for polymerizing silica include using for growth an "active" silica feed which is dilute, i.e., in the concentration range below 3% $SiO_2$, preferably below 2% $SiO_2$, while maintaining the pH in the system in the range of 7.5 to 10.0, maintaining the temperature above 60° C. and preferably above 90° C., and maintaining the salt content at a low level, i.e., below 0.1 equivalents per liter.

The salt content of the starting sol must be within the range above prescribed. If the salt content of the sol as prepared is too high the excess can be taken out by such methods as passing the sol over cation- and anion-exchange resins or by dialysis. In any event care must be exercised not to permit the sol to remain long outside of the specified ratio range, readjustment being made if necessary by adding alkali.

Ordinarily it will be found that when the sol is prepared by methods as above described the salt content will be too low, and upward adjustment will have to be made. Since the silica concentration is below about 35% this adjustment can usually be made without any deleterious effect on the sol; however, it is ordinarily preferable to dissolve the required quantity of salt and add this to the sol, rather than to add the salt directly to the sol. Characteristic of the salts that may be so added are sodium chloride, sodium sulfate, or potassium chloride.

In making the salt adjustment, it will be remembered that some salt inevitably comes into the sol as impurities introduced by the method of preparation of the sol and such quantities must be included in the total.

Having selected a suitable starting sol and made any necessary adjustments therein, the sol can then be concentrated according to a process of this invention by evaporating water therefrom until the silica content is from above 35% to the maximum permitted by the expression $$\frac{110}{(1+.000667A)^3 + 0.6}$$

This maximum concentration of $$\frac{110}{(1+.000667A)^3 + 0.6}$$

is obtained when the relative viscosity of the sol being processed is at the minimum value of 1.13 as measured at pH 2 and 10% $SiO_2$. If the relative viscosity of this sol measured as indicated is higher than 1.13, the maximum concentration at which sols of maximum stability are produced will be correspondingly lower. For instance, for a silica sol containing particles which have a surface area of 60 m.$^2$/g., the maximum concentration for sols of maximum stability is shown below.

SOLS OF PARTICLES OF 60 M.$^2$/G.

| Relative viscosity at pH 2 and 10% $SiO_2$: | Sol concentration, percent $SiO_2$ |
|---|---|
| 1.13 | 64 |
| 1.20 | 53 |
| 1.25 | 47 |
| 1.30 | 43 |
| 1.35 | 39 |
| 1.40 | 37 |
| 1.45 | 35 |

More broadly, the maximum concentration for sols of maximum stability is determined as follows: First one determines the maximum concentration, G, which is obtained in the case of a sol of surface area A m.$^2$/g. and having a relative viscosity of 1.13 from the expression $$G = \frac{110}{(1+0.000667A)^3 + 0.6}$$

For a sol which has a relative viscosity, as measured at pH 2 and 10% $SiO_2$, greater than 1.13, the maximum silica content to which it can be concentrated and still maintain maximum stability can be interpolated from the following table, the maximum concentration, of course, being greater than 35% by weight of $SiO_2$.

| Relative viscosity at pH 2.0 and 10% $SiO_2$: | Concentration of sol, percent $SiO_2$ |
|---|---|
| 1.13 | 1.00 G |
| 1.20 | 0.83 G |
| 1.25 | 0.74 G |
| 1.30 | 0.67 G |
| 1.35 | 0.61 G |
| 1.40 | 0.58 G |
| 1.45 | 0.55 G |

Ordinarily in effecting concentration by evaporation of water heat is supplied to the sol. If the rate of evaporation and of supplying heat to the sol is too high, there is a danger that the sol will be overconcentrated where the heat enters the sol body. This hazard can be minimized by maintaining a high rate of turbulence in the sol during evaporation.

It is interesting to note that if a silica sol otherwise answering the description of the starting sol but containing no salt is concentrated, even by a preferred process of this invention, to above about 35%, the sol becomes very viscous, often approaching the consistency of honey. However, when salt is added as above described, the viscosity of the sols decreases. Furthermore the salt-containing sol can be concentrated to a much higher level and still maintain fluidity.

UTILITY OF PRODUCTS

The art is already familiar with various uses of silica sols, especially alkali-stabilized sols, and the products of the present invention can be used in any of these applications. The more dilute of the products thus can be used for increasing the soil resistance of surfaces, increasing the skid resistance of wax films on floors, and increasing the load-carrying ability of elastomer foams. The sol can be applied as a coating to the surface whose soil resistance is to be increased. Thus, the sol can be added directly to the wax emulsions from which the wax films on floors are laid down. The elastomer foam to be strengthened can be immersed in the silica sol and the excess sol squeezed out. Upon drying of the films so produced the improved surface characteristics are noted.

In the foregoing uses this silica sol can sometimes be advantageously diluted. However, there are other uses where the higher concentrations of the present products constitute an advantage. Thus, for instance, the addition of silica sols containing less than 35% $SiO_2$ to latex base paints is disadvantageous because it dilutes the paint. On the other hand, the addition of silica sols is desired because they improve the adhesion of the paint to the substrate as well as improve the washability and dry abrasion resistance of the paint. The concentrated, low-viscosity sols of the present invention are ideal for this use, whereas the sols heretofore available are less effective because they are either too dilute or too viscous or both.

Similarly, the concentrated sols of the present invention, especially those containing particles about 30 millimicrons in diameter, are useful in forming ceramic slips. They give to the slips increased green strength because of their relatively low water content, and the fired products have greater strength. Also, they provide maximum colloidal silica content with least tendency of the ceramic body to crack upon being dried.

Sols of the present invention are also useful as additives in latex adhesives for leather. Again the high concentration of silica and relatively low water content is an advantage.

The invention will be better understood by reference to the following illustrative examples:

Example 1

A 1,430-gram portion of sodium silicate, containing 28.4% $SiO_2$ and having an $SiO_2:Na_2O$ weight ratio of 3.25, was diluted to 10 kilograms with distilled water. A 9,640-gram portion of this solution was passed down through a column containing 2.50 liters of "Dowex" 50 cation-exchange resin in the hydrogen form at such a rate that the effluent stream at all times had a pH less than 4. The effluent was added directly as formed to the remaining 360 grams of the dilute sodium silicate solution. The resin column was washed down with 1.40 liters of distilled water, the wash being added to the ion-exchange effluent. The solution at this point contained 3.5% $SiO_2$, had an $SiO_2:Na_2O$ weight ratio of 90, and a pH of 7.9.

This sol was heated in a stainless steel autoclave without agitation to 185° C. over a period of about three hours. It was held at 185° C. for six hours and then cooled to room temperature at a rate of 30° C. per hour.

The product at this point was an opalescent sol containing particles averaging 21 millimicrons in diameter as determined by electron micrographs. This sol was now passed through an ion-exchange column containing 100 milliliters of "Dowex" 50 resin in the hydrogen form and 100 milliliters of "Amberlite" IR–4B anion-exchange resin in the hydroxyl form, thoroughly premixed. "Amberlite" IR–4B is a gelled and heat-hardened phenolformaldehyde resin having non-aromatic aminomethyl groups as substituents of the phenyl nuclei—see Example 4 of U.S. Patent 2,341,907. The pH of the effluent sol was 3.5 and the specific resistance was 17,100 ohms. To a portion of this sol containing 350 grams $SiO_2$ was added with vigorous agitation 20.5 milliliters of 1.0 N NaOH solution to give an $SiO_2:Na_2O$ mol ratio of 570.

Thereafter the sol was concentrated to 20% $SiO_2$. At this stage the relative viscosity was determined by dilution of a portion of the sol to 10% and adjusting the pH to 2.0. The relative viscosity was 1.19.

To the 20% $SiO_2$, alkali-stabilized, salt-free silica sol, a solution of 1 N NaCl was added until the salt level in the sol was 0.004 N. The sol was then concentrated by boiling under reduced pressure at 35° C. until a concentration of 51% $SiO_2$ was reached.

The product was a stable, low-viscosity silica sol. The particles in the sol had a surface area of 150 m.$^2$/g.; the sol was alkali-stabilized; it had an $SiO_2:Na_2O$ mol ratio of 570; it also had an NaCl content of 0.01 N.

Example 2

A commercial silica sol, containing 30% $SiO_2$, having an $SiO_2:Na_2O$ ratio of 90:1 and containing dense amorphous silica particles having a surface area of about 200 m.$^2$/g., had a viscosity of 3.0 centipoises. When the sol was diluted to 10% $SiO_2$ and the pH was adjusted to 2, the relative viscosity was about 1.3. When an attempt was made to concentrate this material to 40% $SiO_2$, the resulting product was extremely viscous; in fact it was so non-fluid that it was impossible to handle as a liquid.

By adding 0.006 equivalent of $Na_2SO_4$ per liter to this silica sol, the viscosity dropped to 2.6 centipoises. Moreover, the resulting product could then be concentrated to a sol of 40% $SiO_2$.

This 40% $SiO_2$ silica sol had the following characteristics: The particles in the sol had a surface area of 200 m.$^2$/g. The sol had an $SiO_2:Na_2O$ mol ratio of 90:1, and hence was alkali stabilized at an $SiO_2:Na_2O$ ratio of 18,000/A:1. It contained about 0.02 N $Na_2SO_4$.

Example 3

A silica sol containing 3.5% $SiO_2$, having an $SiO_2:Na_2O$ weight ratio of 90, and a pH of 7.9, was prepared exactly as described in Example 1.

This sol was then heated in a stainless steel autoclave with no applied agitation to 215° C., held at this temperature for six hours, and cooled to room temperature at a rate of 30° C. per hour.

An amount of this sol containing 400 grams of $SiO_2$ was passed down through a column of mixed ion-exchange resin containing 100 milliliters of "Dowex" 50 in the hydrogen form and 100 milliliters of "Amberlite" IR–4B in the hydroxyl form. The effluent sol had a pH of 3.4, a specific resistance of 16,800 ohms, and contained 3.35% $SiO_2$ by weight. It was then stabilized by addition of 13.3 milliliters 1.0 N NaOH, giving an $SiO_2:Na_2O$ mol ratio of 1,000. Then a solution of NaCl was added to make the NaCl concentration in the sol up to 0.0007 N. The sol, weighing 11,990 grams, was now concentrated by boiling under reduced pressure at 30–35° C. until 11,220 milliliters of water had been evaporated.

The remaining sol contained 52% $SiO_2$ in the form of particles whose average diameter was 32.90 millimicrons, and was stable with respect to gelation.

This product is an example of a product of the invention. The sol is alkali stabilized at an $SiO_2:Na_2O$ ratio of 90,000/A:1. It contains 0.01 N NaCl. It has low viscosity. The surface area of the particles in the sol is 90 m.$^2$/g.

The viscosity of the sol can be further reduced by adding additional NaCl. Thus one can adjust the NaCl content of the sol to 0.04 N. Such a sol is also an example of the products of the invention. It is stable, i.e., its viscosity does not change on storage at room temperature even after several months.

*Example 4*

A salt-free, deionized sol having particles 21 millimicrons in diameter and containing 20% $SiO_2$ was prepared as in Example 1, sufficient $NH_4OH$ was added to adjust the $SiO_2:NH_3$ ratio to 600:1, the pH being 7.6. Electrolyte, $Na_2SO_4$, was added to increase the salt content to 0.006 N and the sol was concentrated to 54% $SiO_2$. After storing for three months at room temperature, it was still as fluid as when it was originally prepared.

The invention claimed is:

1. An aquasol of amorphous silica particles having a surface area, A, of from 60 to 300 square meters per gram, the sol being stabilized by containing an amount of alkali sufficient to give the sol an $SiO_2:M_2O$ mol ratio, R, of from 10,000/A:1 to 120,000/A:1 where M is a monovalent cation in which there is no hydrocarbon chain substituent longer than 4 carbon atoms, the concentration of silica in the sol being from above $$35 \text{ to } \frac{110}{(1+.000667A)^3+0.6} \text{ percent}$$

and the sol containing from $(0.0015+0.0065(x-y))$ to .05 equivalents of a soluble salt per liter of solvent, the salt having a cation of the group M, where $$x^{1001}=R-129 \text{ and } y^{1001}=R-501$$

2. An aquasol of claim 1 wherein the cation, M, of the stabilizing alkali is sodium.

3. An aquasol of amorphous silica particles having a surface area, A, of from 60 to 300 square meters per gram, the sol being stabilized by containing an amount of alkali sufficient to give the sol an $SiO_2:M_2O$ mol ratio, R, of from 10,000/A:1 to 120,000/A:1 where M is a monovalent cation selected from the group consisting of alkali metal, ammonium, and short-chain, hydrocarbon-substituted ammonium ions, the concentration of silica in the sol being from above $$35 \text{ to } \frac{110}{(1+.000667A)^3+0.6} \text{ percent}$$

and the sol containing from $(0.0015+0.0065(x-y))$ to .05 equivalents of a soluble salt per liter of solvent, the salt having a cation of the group M, where $$x^{1001}=R-129 \text{ and } y^{1001}=R-500$$

4. An aquasol of amorphous silica particles having a surface area of about 200 square meters per gram, the sol being stabilized with an amount of sodium alkali sufficient to give the sol an $SiO_2:Na_2O$ mol ratio of about 100:1, the concentration of silica in the sol being from above 35 to 54%, and the sol containing from 0.00152 to .05 equivalents per liter of a soluble salt of a monovalent cation selected from the group consisting of alkali metal, ammonium, and short-chain, hydrocarbon-substituted ammonium ions.

5. In a process for producing concentrated silica aquasols of low viscosity the steps comprising preparing an aquasol of amorphous silica particles having a surface area, A, of from 60 to 300 square meters per gram, said sol having a relative viscosity, as measured at 10% $SiO_2$ and pH 2, of from 1.13 to 1.45 containing less than 35% $SiO_2$ by weight, deionizing said sol by bringing it into contact with a cation exchange resin in the hydrogen form and an anion exchange resin in the hydroxyl form, adjusting the $SiO_2:M_2O$ mol ratio, R, to from 10,000/A:1 to 120,000/A:1, where M is a monovalent cation in which there is no hydrocarbon chain substituent longer than 4 carbon atoms, by adding an alkali of cation M, adding also an amount of soluble salt of a cation of the M group equal to from $$\frac{a}{b}(0.0015+0.0065(x-y)) \text{ to } \frac{a}{b}(0.05)-C$$

where $a$ is the concentration of silica in the sol, $b$ is the concentration of silica desired in the final product, $x^{1001}=R-129$, $y^{1001}=R-501$, and C is calculated from the expression: $\log C=12.1-3.4 \log AR$, and evaporating water from said sol, while supplying heat thereto, until the percent $SiO_2$ concentration by weight is from above $$35 \text{ to } \frac{110}{(1+.000667A)^3+0.6}$$

6. In a process for producing concentrated silica aquasols of low viscosity the steps comprising preparing an aquasol of amorphous silica particles having a surface area, A, of from 60 to 300 square meters per gram, said sol having a relative viscosity, as measured at 10% $SiO_2$ and pH 2, of from 1.13 to 1.45 containing less than 35% $SiO_2$ by weight, deionizing said sol by bringing it into contact with a cation exchange resin in the hydrogen form and an anion exchange resin in the hydroxyl form, adjusting the $SiO_2:M_2O$ mol ratio, R, to from 10,000/A:1 to 120,000/A:1, where M is a monovalent cation selected from the group consisting of alkali metal, ammonium, and short-chain hydrocarbon-substituted ammonium ions, by adding an alkali of cation M, adding also an amount of soluble salt of a cation of the M group equal to from $$\frac{a}{b}(0.0015+0.0065(x-y)) \text{ to } \frac{a}{b}(0.05)-C$$

where $a$ is the concentration of silica in the sol, $b$ is the concentration of silica desired in the final product, $x^{1001}=R-129$, $y^{1001}=R-501$, and C is calculated from the expression: $\log C=12.1-3.4 \log AR$, and evaporating water from said sol, while supplying heat thereto, until the percent $SiO_2$ concentration by weight is from above $$35 \text{ to } \frac{110}{(1+.000667A)^3+0.6}$$

References Cited in the file of this patent

UNITED STATES PATENTS

| | | |
|---|---|---|
| 2,574,902 | Bechtold et al. | Nov. 13, 1951 |
| 2,577,485 | Rule | Dec. 4, 1951 |
| 2,663,614 | Haag | Dec. 22, 1953 |